United States Patent Office 2,923,625
Patented Feb. 2, 1960

2,923,625

METHOD OF PRODUCING DIAZOTYPE PRINTS

Clifford E. Herrick, Jr., Chenango Forks, N.Y., assignor to General Aniline & Film Corporation, New York, N.Y., a corporation of Delaware No Drawing. Application September 11, 1956
Serial No. 609,068

1 Claim. (Cl. 96—49)

This invention relates to the processing of two-component diazotype materials and more particularly to the alkali used as the developing medium.

Machines or apparatus for the production of diazotype prints from two-component diazotype materials require a constant supply or source of ammonia gas for development of said prints. The ammonia gas is obtained by the gentle heating of an aqueous solution of ammonia which is located in trays or troughs within the machine. Although the above system gives satisfactory results as far as the production of diazotype prints is concerned, the necessity of dealing with large quantities of aqueous ammonia has many inconveniences and disadvantages and can even be hazardous. Instances have occurred where containers of aqueous ammonia have exploded, probably because of pressure generated during storage where the temperature was considerably above room temperature.

The transportation of ammonia, particularly by airplane, is also dangerous and contrary to sound operating practice. Again, the filling of the ammonia tanks on the involved machines is rendered unpleasant due to the escape of pungent ammonia fumes, especially in large office buildings where several machines are operated simultaneously.

It is clear that a need exists for a source of ammonia gas other than aqueous ammonia. Preferably, such source should be a solid substance, rich in ammonia, very soluble in order to form a highly concentrated aqueous solution rich in available ammonia, and, in general, be free from the drawbacks associated with the transportation and handling of aqueous ammonia solutions.

It has now been discovered that the above prerequisites are possessed by ammonium carbonate, and the use of this compound as the alkali in the development of the two-component diazotype materials, constitutes the purposes and objects of the present invention.

Ammonium carbonate is rich in ammonia which, I have ascertained, is rather loosely bound so that ammonia gas is liberated from the compound at comparatively low temperatures. The ammonium carbonate has the added advantage in that all of the products from the decomposition of this substance are volatile, e.g., an aqueous solution of ammonium carbonate, on evaporation, produces only ammonia gas, water and carbon dioxide, as illustrated in the following equation:

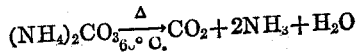

It is preferred to use highly concentrated aqueous solutions of ammonium carbonate. These solutions can be prepared prior to their addition to the white print machines, or solid pellets of ammonium carbonate may be added directly to the alkali supply tanks of said machines.

The following example will more clearly illustrate the invention, but it is understood that the invention is not restricted thereto.

*Example I*

Utilizing substantially ion free water, a 40% aqueous solution of ammonium carbonate is prepared. The ammonium carbonate may be used in the form of a free flowing powder or, if desired, may be pelleted for easier handling. The ammonium carbonate dissolves extremely rapidly. For this reason, a solution may be either made up externally, or alternatively, the water may first be placed in the ammonia supply tank of a white print machine and pellets of ammonium carbonate dropped into the ammonia supply tank. The preferred arrangement within the developing chamber itself is well known. It consists, in general, of a heated trough into which the ammonia-containing solution is dropped. The operating temperature of the chamber for $(NH_4)_2CO_3$ is substantially that used for ordinary ammonia solutions, although, under some circumstances, a somewhat higher temperature may be found to be desirable. It is found that, at moderate developing speeds, the efficiency of development obtained with gases from the ammonium carbonate solution is substantially equivalent to that obtained with ammonia.

I claim:

A process of developing exposed diazotype material comprising a carrier having thereon a light sensitive diazo compound and a coupling component wherein said development takes place in a heated developing chamber having a tank for holding an ammoniacal developing liquid therein which comprises forming an ammoniacal solution in said tank by placing free water and a sufficient quantity of ammonium carbonate in solid form in said tank to produce a solution of ammonium carbonate of about 40% strength, heating said solution to generate moist ammonia fumes in said chamber from said solution and placing said diazotype material in said chamber to be acted on by said fumes, whereby said material is developed.

References Cited in the file of this patent

UNITED STATES PATENTS

| 1,841,653 | Van der Grinten et al. | Jan. 19, 1932 |
| 2,141,103 | Brunk et al. | Dec. 20, 1938 |
| 2,228,562 | Dieterle | Jan. 14, 1941 |

FOREIGN PATENTS

| 553,508 | Great Britain | May 25, 1943 |